United States Patent
Kuo

(10) Patent No.: US 6,563,705 B1
(45) Date of Patent: May 13, 2003

(54) LIQUID CRYSTAL DISPLAY COMPUTER WITH A MOVABLE REAR HOUSING

(75) Inventor: Yan-Lin Kuo, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 0 days.

(21) Appl. No.: 10/063,079

(22) Filed: Mar. 17, 2002

(30) Foreign Application Priority Data

Nov. 15, 2001 (TW) ...................................... 090128376 A

(51) Int. Cl.⁷ .................................................. H05K 7/20
(52) U.S. Cl. ...................... 361/687; 349/58; 361/683; 361/695
(58) Field of Search ........................... 349/58; 248/917; 415/213.1, 214.1; 454/184; 312/223.1, 223.2, 223.3; 165/80.3, 121–126; 361/681–683, 687, 690, 692, 695

(56) References Cited

U.S. PATENT DOCUMENTS 5,100,098 A * 3/1992 Hawkins .................. 248/291.1
5,264,992 A * 11/1993 Hogdahl et al. ............. 361/681
6,104,602 A * 8/2000 Morris et al. ................... 361/6
6,370,023 B1 * 4/2002 Su ............................. 361/287

* cited by examiner

Primary Examiner—G P Tolin
(74) Attorney, Agent, or Firm—Winston Hsu

(57) ABSTRACT

A desktop computer comprises a base, a front housing, a display panel, a computer motherboard, and a rear housing. The front housing has a front end facing a user, a rear end, an upper end, a lower end, and further has a recess with an opening facing the rear end. The bottom side of the recess is positioned on the back of the front end of the front housing. The display panel is vertically mounted in the front end of the front housing, and the computer motherboard is vertically mounted on the bottom side of the front housing recess and electrically connected with display panel. The rear housing is mounted on the rear end of the front housing for covering the recess on the rear end of the front housing.

11 Claims, 6 Drawing Sheets

LIQUID CRYSTAL DISPLAY COMPUTER WITH A MOVABLE REAR HOUSING

BACKGROUND OF THE INVENTION

1. Field of the Invention

The present invention relates to a desktop computer, specifically to a liquid crystal display computer with a movable rear housing.

2. Description of the Prior Art

Referring to FIG. 1, a conventional desktop computer is shown to comprise a main computer housing 12, a computer monitor 10, such as a cathode ray tube (CRT) or a liquid crystal display (LCD) monitor, a computer keyboard 16, a computer mouse 18, and a speaker unit 20. The different components of the conventional desktop computer are generally separate from each other, thereby resulting in many inconveniences to the user. For example, the conventional desktop computer occupies a relatively large amount of space on a desk when in use. In addition, a large amount of time and effort is required to move all of the components of the conventional desktop computer from one place to another.

Therefore, an all-in-one desktop LCD computer made by assembling all components has been developed. The popular desktop LCD computer mainly comprises a LCD monitor and a computer housing connected to the rear end of the monitor. The computer control devices such as a motherboard, a central processing unit (CPU), memory, etc., are installed in the computer housing. However, tools are necessary for disassembling the computer housing, thereby resulting in many inconveniences to the user when the LCD computer is in need of upgrade or repair. Therefore, the inconvenient assembling properties greatly reduce the value and useful life of computer products.

SUMMARY OF THE INVENTION

It is therefore a primary objective of the claimed invention to provide a desktop LCD computer with a movable rear housing to resolve the above-mentioned problems.

In a preferred embodiment of the claimed invention, the desktop computer comprises a base, a front housing, a display panel, a computer motherboard, and a rear housing. The front housing has a front end facing a user, a rear end, an upper end, a lower end, and further has a recess with an opening facing the rear end. The bottom side of the recess is positioned on the back of the front end of the front housing. The display panel is vertically mounted in the front end of the front housing, and the computer motherboard is vertically mounted on the bottom side of the front housing recess and electrically connected with display panel. The rear housing is mounted on the rear end of the front housing for covering the recess on the rear end of the front housing.

In contrast to the prior desktop LCD computer, the desktop LCD computer of the claimed invention has a modular design including a planar display, a host, and a storage device incorporated with a conveniently assembled housing. Therefore, the repair process of the product is substantially simplified and damages to other units during the repair process are prevented. In addition, the desktop LCD computer of the claimed invention extends the lifetime of the product, offers more flexibility when upgrading, and improves customer service.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
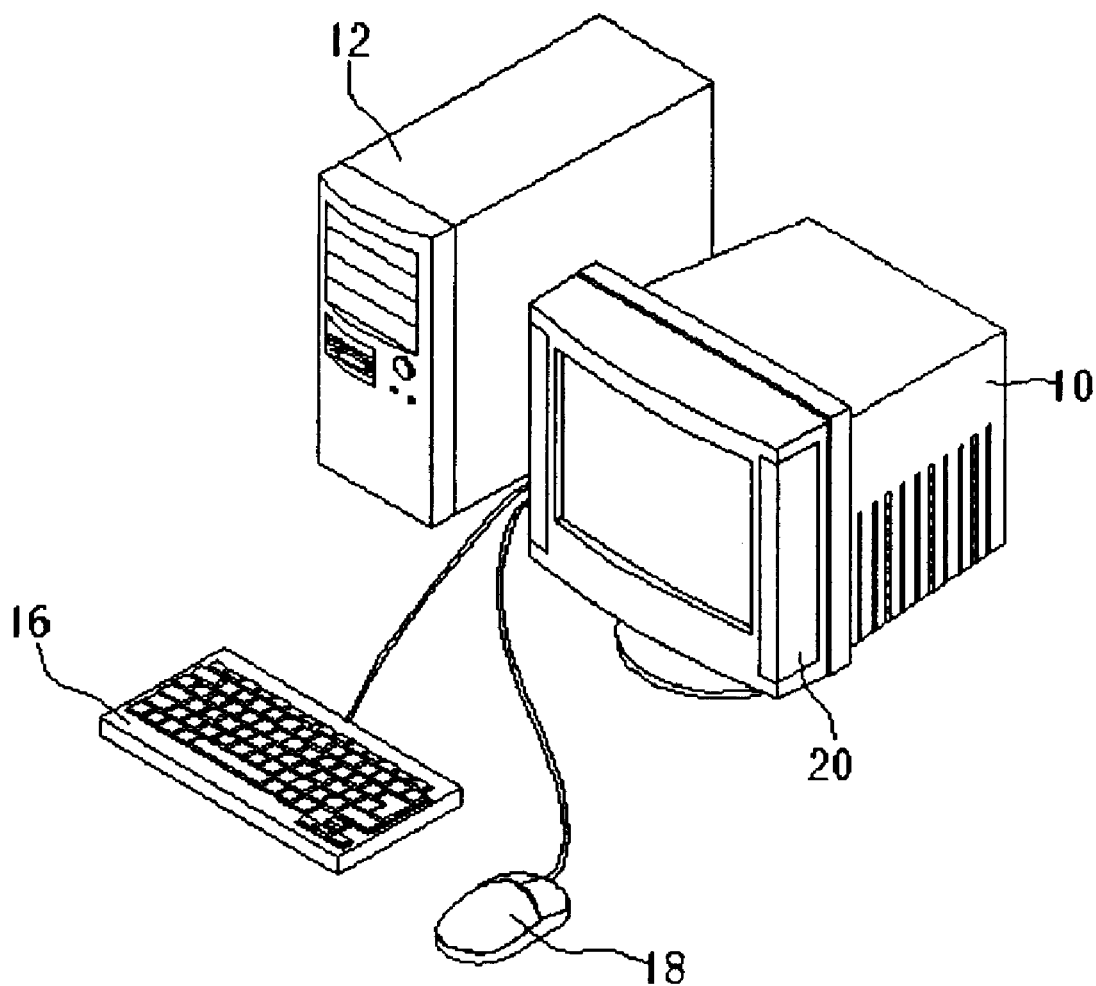
FIG. 1 is a schematic side view of a conventional desktop computer.
Figure 2:
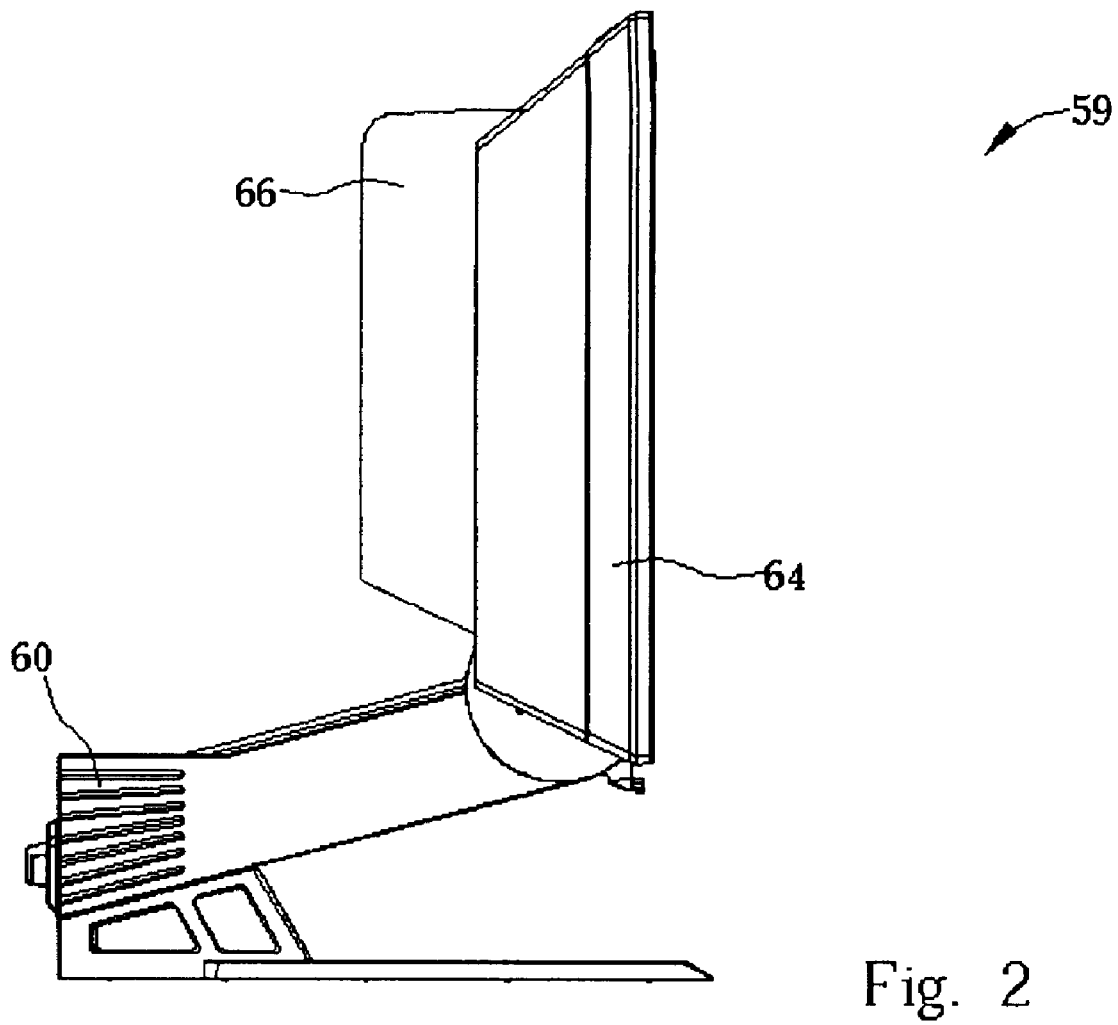
FIG. 2 is a schematic side view of a desktop LCD computer according to the present invention.
Figure 3:
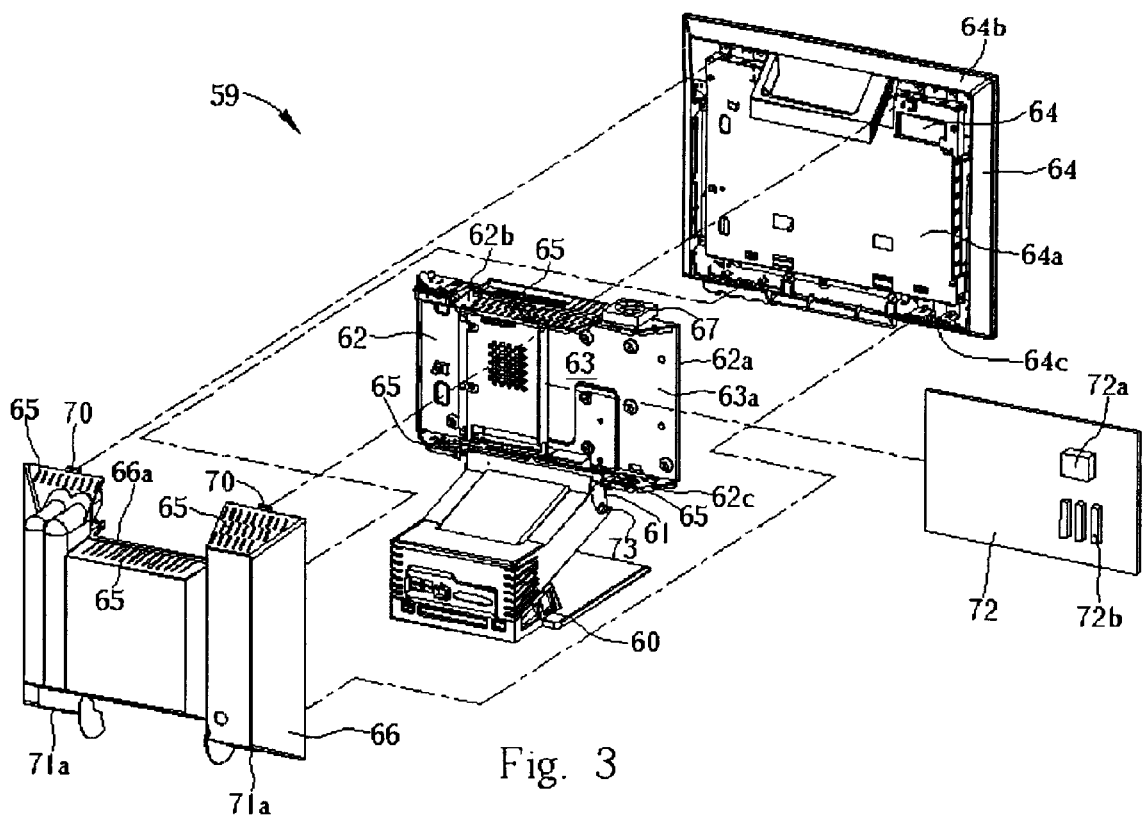
FIG. 3 is an exploded diagram of the desktop LCD computer shown in FIG. 2.

Please refer to FIG. 2. FIG. 2 is a schematic side view of a desktop LCD computer 59 according to the present invention. In a preferred embodiment of the present invention, as shown in FIG. 2, the desktop computer 59 comprises a base 60, a front housing 62, a liquid crystal display (LCD) panel 64, a computer motherboard 72, and a rear housing 66. Please refer to FIG. 3. FIG. 3 is an exploded diagram of the desktop LCD computer 59 shown in FIG. 2. The base 60 is used for supporting the desktop computer 59 on a surface, and a recess 73 with a forward-facing opening is positioned in the base 60 for installing a CD-ROM drive 61. The front housing 62 comprises a front end 62a facing a user, a rear end, an upper end 62b, and a lower end 62c rotatably mounted on the base 60. The front housing 62 further comprises a recess 63 with an opening facing the rear end, and a bottom side 63a of the recess 63 is positioned on a back of the front end 62a of the front housing 62. The horizontal width of the LCD panel 64 is greater than the vertical height of the LCD panel 64, and the LCD panel 64 is vertically mounted on the front end 62a of the front housing 62 for displaying an image frame for the user. The computer motherboard 72 is vertically mounted on the bottom side 63a of the front housing recess 63, and is electrically connected to the LCD panel 64. The horizontal width of the computer motherboard 72 and the horizontal width of the bottom side 63a of the front housing recess 63 is also greater than both the vertical height of the motherboard 72 and the vertical height of the bottom side 63a of the front housing recess 63. Additionally, a central processing unit (CPU) 72a and at least one memory module 72b are positioned on the computer motherboard 72 for controlling the operation of the desktop computer 59.

The front housing 62 has a plurality of vent holes 65 positioned both on an upper end 62b and a lower end 62c, and the rear housing 66 also has a plurality of vent holes 65 positioned on an upper end and a lower end. These vent holes 65 are used for eliminating heat generated by the computer motherboard 72 and the CPU 72a positioned in the front housing recess 63. Furthermore, a fan 67 is installed on the vent holes 65 positioned on an upper end 62b of the front housing 62 for driving the heat from the recess 63 and the rear housing 66 upward. The front housing recess 63 is composed of metal, and a metal shield (not shown) is positioned on the front end 66a of the rear housing 66 for contacting the opening of the front housing recess 63 so as to prevent electromagnetic interference (EMI).

Figure 4:
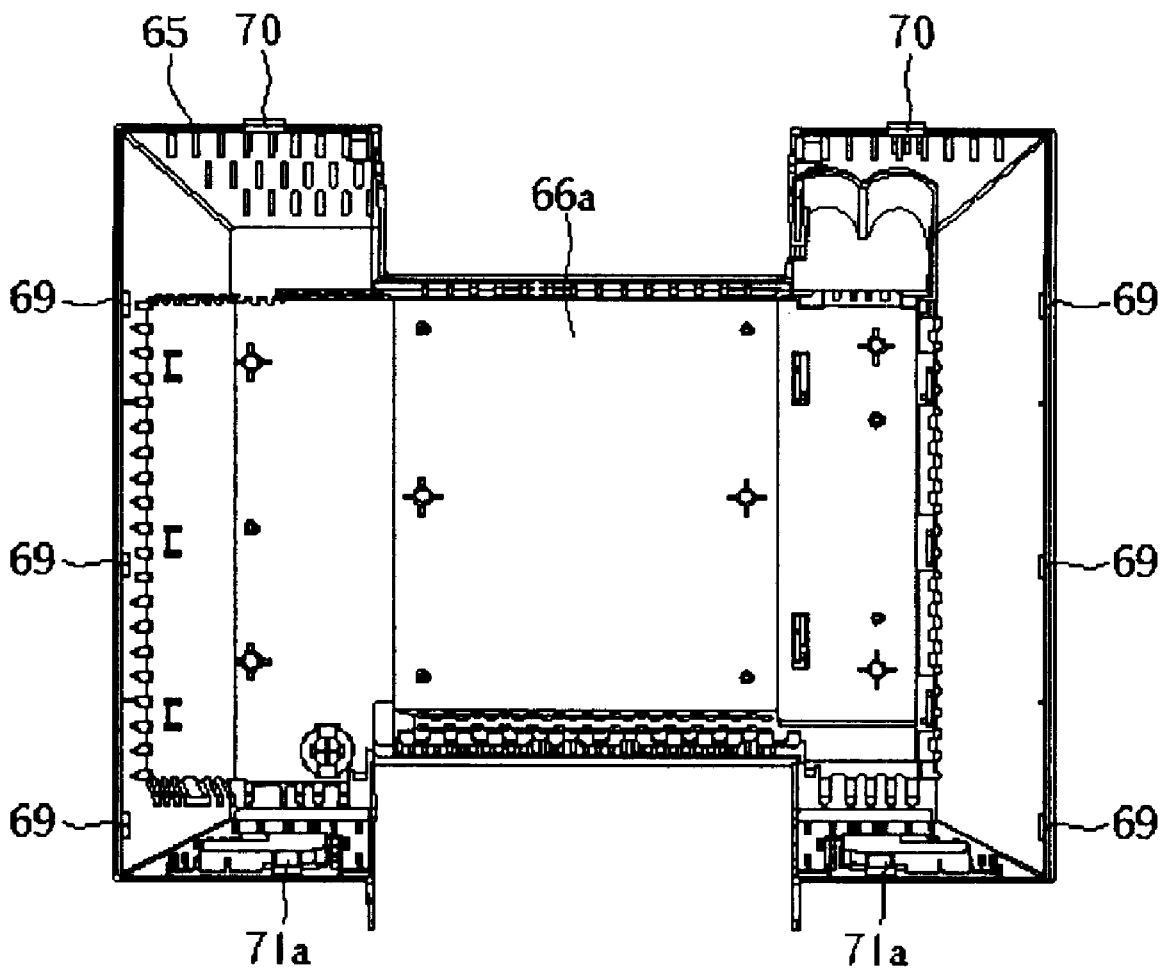
FIG. 4 is a component diagram of a movable rear housing of the desktop LCD computer shown in FIG. 2.

The main feature of the desktop computer 59 according to the present invention is a movable rear housing. FIG. 4 is a component diagram of the movable rear housing. The rear housing 66 is used for covering the rear end of the front housing 62 and has two groups of latches 70, 71 positioned on two opposite sides of the rear housing 66 for engaging with two groups of latch engaging devices positioned on corresponding sides of a back 64a of the LCD panel 64. The rear housing 66 is mounted on the LCD panel 64 by latching the two groups of latches 70, 71 of the rear housing 66 with the two groups of latch engaging devices on the back 64a of the LCD panel 64, so that the rear housing 66 is capable of sealing the opening of the recess 63 positioned in the rear end of the front housing 62. The rear housing 66 further comprises two rows of positioning devices 69 disposed on the left side and right side of the rear housing 66 for inserting into recesses disposed on corresponding sides of a back 64a of the LCD panel 64, such that the left and right side of the rear housing 66 is vertically mounted on the rear end of the front housing 62. In the preferred embodiment of the present invention, the group of latches positioned on the upper end of the rear housing 66 comprises immovable latches 70, and the other group of latches positioned on the lower end of the rear housing. 66 comprises movable latches 71.

Figure 5:
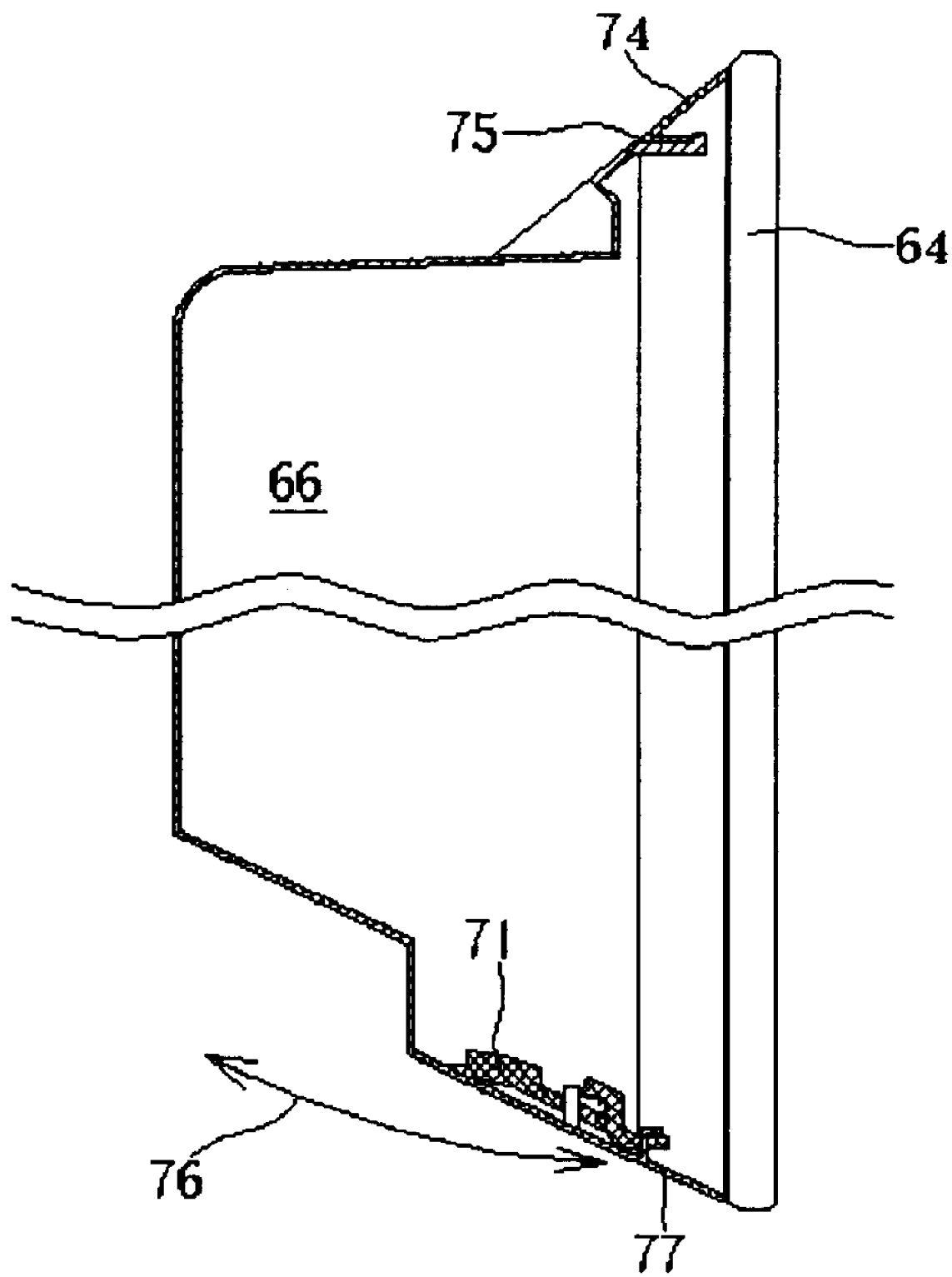
FIG. 5 is a schematic side view of the rear housing.

FIG. 5 is a schematic side view of the rear housing 66. For mounting the rear housing 66 on the rear end of the front housing 62, the group of immovable latches 70 first hooks the skirt 74 positioned on the corresponding upper end of the back of the LCD panel 64. Therefore, the rear housing 66 takes the pivot 75 as a rotating center and is able to rotate along the direction 76 shown in FIG. 5. Finally, the group of movable latches 71 positioned on the lower end of the rear housing 66 engages with the skirt 77 positioned on the corresponding lower end of the back of the LCD panel 64 so as to fix the rear housing 66.

Figure 6:
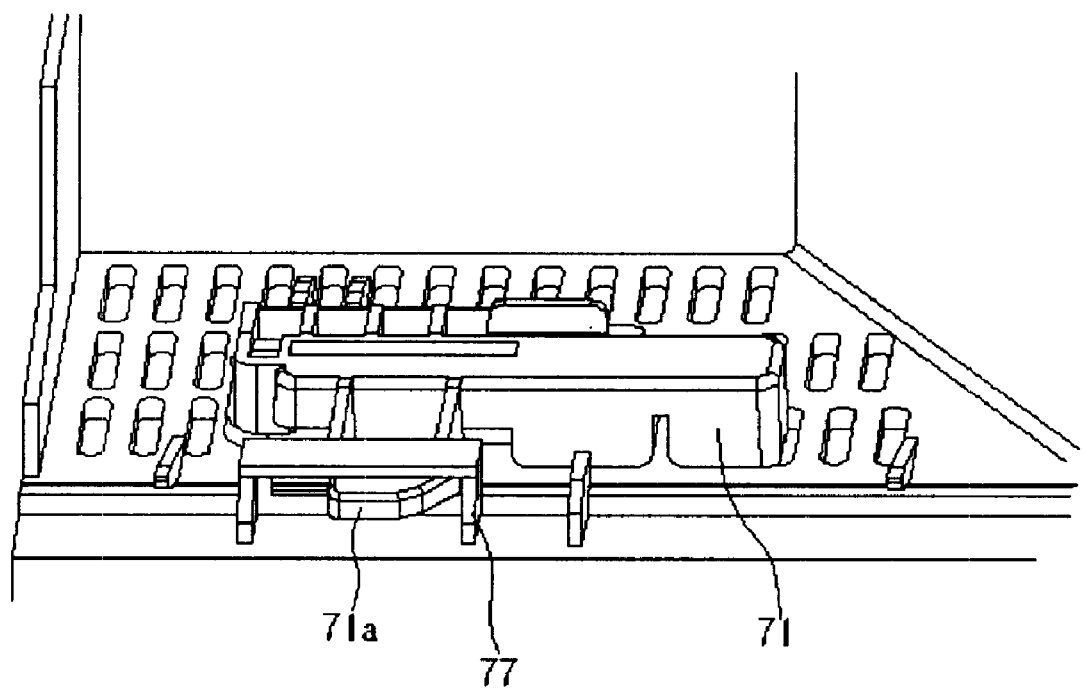
FIG. 6 is a local amplified diagram of a movable latch positioned on a lower side of the rear housing shown in FIG. 5.

FIG. 6 is a local amplified diagram of the movable latch 71, which has a spring inside, positioned on a lower side of the rear housing 66 shown in FIG. 5. When the rear housing 66 is fixed in the rear end of the front housing 62, the hook portion 71a of the movable latch 71 engages with the skirt 77 positioned on the corresponding lower end of the back of the LCD panel 64. When removing the rear housing 66 from the rear end of the front housing 62, such that a user can turn the movable latch 71 leftward to compress the spring in the latch 71, the hook portion 71a of the latch 71 shifts leftward to disengage the latch 71 from the skirt 77.

The desktop LCD computer of the present invention uses designed latches for the easy fabrication or disassembling of a rear housing of a computer. Therefore, the repair process of products is substantially simplified and damages to other units during the repair process are prevented. Additionally, the user can upgrade the computer according to individual requirements. Compared with the prior art desktop LCD computer, the desktop LCD computer of the present invention extends the product value and the product lifetime, offers more flexibility when upgrading, and improves customer service.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A desktop computer comprising:
   a base for supporting the desktop computer on a surface;
   a front housing comprising a front end facing a user, a rear end, an upper end and a lower end rotatably mounted on the base, the front housing further comprising a recess with an opening facing the rear end, a bottom side of the recess positioned on a back of the front end of the front housing;
   a display panel vertically mounted on the front end of the front housing for displaying an image frame to the user;
   a computer motherboard vertically mounted on the bottom side of the front housing recess and electrically connected to the display panel, a central processing unit (CPU) and at least one memory module positioned on the computer mother board for controlling the operation of the desktop computer; and
   a rear housing for covering the rear end of the front housing, the rear housing having two groups of latches positioned on two opposite sides of the rear housing for engaging with two groups of latch engaging devices positioned on corresponding sides of a back of the display panel, the rear housing being mounted on the display panel by latching the two groups of latches of the rear housing with the two groups of latch engaging devices on the back of the display panel, so that the rear housing is capable of sealing the opening of the recess positioned in the rear end of the front housing.

2. The desktop computer of claim 1 wherein the two groups of latches are positioned on an upper side and a lower side of the rear housing, respectively.

3. The desktop computer of claim 2 wherein two rows of positioning devices are disposed on the left and right side of the rear housing, respectively, for vertically mounting the left and right side of the rear housing on the rear end of the front housing.

4. The desktop computer of claim 2 wherein one of the two groups of latches comprises immovable latches and the other group comprises movable latches, for removing the rear housing from the rear end of the front housing, such that a user can turn the group of movable latches to disengage the movable latches from the corresponding latch engaging devices positioned on the back of the display panel.

5. The desktop computer of claim 4 wherein the group of movable latches comprises two movable elastic latches and the user can simultaneously turn the two movable latches inward or outward to disengage from the corresponding latch engaging devices positioned in the rear end of the front housing.

6. The desktop computer of claim 1 wherein a recess with a forward-facing opening is positioned in the base for installing a CD-ROM drive.

7. The desktop computer of claim 1 wherein the display panel is a liquid crystal display panel.

8. The desktop computer of claim 1 wherein the horizontal width of the display panel is greater than the vertical height of the display panel, and the horizontal width of the computer mother board and the horizontal width of the bottom side of the front housing recess is also greater than the vertical height of the mother board and the vertical height of the bottom side of the front housing recess, respectively.

9. The desktop computer of claim 1 wherein the front housing has a plurality of vent holes positioned both on an upper end and a lower end, and the rear housing also has a plurality of vent holes positioned on an upper end and a lower end, the vent holes used for eliminating heat generated by the computer motherboard and the CPU positioned in the front housing recess.

10. The desktop computer of claim 9 wherein a fan is installed on the vent holes positioned on an upper end of the front housing for driving the heat from the recess and the rear housing upward.

11. The desktop computer of claim 1 wherein the front housing recess is composed of metal and a metal shield is positioned on the front end of the rear housing for contacting the opening of the front housing recess so as to prevent electro-magnetic interference (EMI).

* * * * *